(12) United States Patent
Hodge

(10) Patent No.: US 6,443,270 B1
(45) Date of Patent: Sep. 3, 2002

(54) SLACK ADJUSTER

(75) Inventor: Michael Hodge, Rozelle (AU)

(73) Assignee: Westinghouse Brakes Australia Pty. Limited, Concord West (AU)

( * ) Notice: Subject to any disclaimer, the term of this patent is extended or adjusted under 35 U.S.C. 154(b) by 0 days.

(21) Appl. No.: 09/704,286

(22) Filed: Nov. 1, 2000

(30) Foreign Application Priority Data

Nov. 1, 1999 (AU) .............................................. PQ3819

(51) Int. Cl.$^7$ .............................................. F16D 65/38
(52) U.S. Cl. ................... 188/196 BA; 188/198
(58) Field of Search .................. 188/198, 199, 188/200, 196 BA, 196 D

(56) References Cited

U.S. PATENT DOCUMENTS

| | | | | |
|---|---|---|---|---|
| 2,648,996 A | * | 8/1953 | MacDougall | 188/196 BA |
| 3,155,195 A | * | 11/1964 | Brawerman | 188/196 BA |
| 3,871,495 A | * | 3/1975 | Devitt | 188/196 BA |
| 4,583,622 A | * | 4/1986 | Ebbunghaus et al. | 188/196 BA |
| 4,771,868 A | * | 9/1988 | Haydu | 188/52 |
| 5,184,701 A | * | 2/1993 | Mamery | 188/196 BA |
| 5,259,485 A | * | 11/1993 | Jackson | 188/198 |
| 5,305,856 A | * | 4/1994 | Edwards | 188/196 BA |
| 5,718,308 A | * | 2/1998 | Chung | 188/196 BA |

* cited by examiner

Primary Examiner—Jack Lavinder
Assistant Examiner—Robert A. Siconolfi
(74) Attorney, Agent, or Firm—Wolf, Greenfield & Sacks, P.C.

(57) ABSTRACT

A rotary slack adjuster (11) for use in a brake system of a vehicle (10) for compensating for wear in brake friction lining. The adjuster (11) includes an input arm (26) for connection to an actuating piston (25) of a brake actuator, an output arm (31) for connection to an output rod (24), and a rotatable member (49). Coupling device are provided for coupling the input arm (26), the output arm (31) and the rotatable member (49) together for mutual rotation during brake actuation in each of a first direction and a second opposite direction, while the rotatable member is confined to rotate between end limits in each of the first and second directions. The coupling device permits the input arm and the output arm to further mutually rotate in the first direction relative to rotatable member upon the rotatable member rotating to the end limit in the first direction. The coupling device further permits the input arm to further rotate in the second direction relative to the output arm and the rotatable member upon the rotatable member rotating to the end limit in the second direction at which end limit the coupling device prevents further rotation in the second direction of the output arm. The arrangement permits repositioning of the input and output arms relative to the rotatable member and by that mechanism results in a shift in the brake friction lining toward the braking surface, so compensating for wear in the friction lining.

21 Claims, 4 Drawing Sheets

SLACK ADJUSTER

FIELD OF THE INVENTION

The present invention relates to a slack adjuster which is principally, but not exclusively, for use in rail transport vehicles. It will be convenient to describe the invention in relation to its particular application to rail bogies, although it is to be appreciated that the invention could have wider application.

BACKGROUND OF THE INVENTION

Slack adjusters are employed in rail bogie braking systems that utilise sacrificial brake or friction linings, to compensate for wear of the friction lining over time. Slack adjusters operate by progressively shifting the brake shoes on which the friction lining is mounted, toward the braking surface that the friction lining engages during braking. Depending on the particular style of slack adjuster and the arrangement to which it is applied, the adjuster may either act directly or indirectly on the brake shoes.

It is known to apply linear slack adjusters to rail bogies. These devices employ spring pressure to take-up and remove slack in brake levers and linkages upon lining wear. However, linear devices employ large springs that store energy and therefore they can be very dangerous during assembly and normal maintenance. Additionally, linear slack adjusters extend through the central bolster of a rail bogie and require a large opening for that purpose.

It is an object of the present invention to provide a slack adjuster which overcomes or at least alleviates the above disadvantages. It is a further object of the invention to provide a rotary slack adjuster of robust construction and of relatively low maintenance.

SUMMARY OF THE INVENTION

According to the present invention there is provided a rotary slack adjuster for use in a brake system of a vehicle for compensating for wear in brake friction lining, said adjuster including an input arm for connection to an actuating piston of a brake actuator, an output arm for connection to an output rod, and a rotatable member, coupling means being provided for coupling said input arm, said output arm and said rotatable member together for mutual rotation during brake actuation in each of a first direction and a second opposite direction, said rotatable member being confined to rotate between end limits in each of said first and second directions, wherein said coupling means permits said input arm and said output arm to further mutually rotate in said first direction relative to rotatable member upon said rotatable member rotating to said end limit in said first direction, and said coupling means being arranged so that upon relative rotation between said input and output arms and said rotatable member exceeding a predetermined amount, said input and output arms are restrained against return rotation relative to said rotatable member and are thus repositioned relative to said rotatable member, and wherein said coupling means permits said input arm to further rotate in said second direction relative to said output arm and said rotatable member upon said rotatable member rotating to said end limit in said second direction at which end limit said coupling means prevents further rotation in said second direction of said output arm, and said coupling means being arranged so that upon relative rotation between said input arm and each of said output arm and said rotatable member exceeding a predetermined amount, said input arm is restrained against return rotational movement relative to said output arm and said rotatable member, and said input arm is thus repositioned relative to said output arm and said rotatable member, wherein in use, a brake system including said slack adjuster is arranged so that the respective repositioning of said input and output arms results in a shift in the brake friction lining toward the braking surface, so compensating for wear in said friction lining.

A slack adjuster according to the present invention is of rotary operation and has substantial mechanical capacity which makes its application ideal for rail bogies.

The present invention further provides a brake system for a vehicle, including a slack adjuster of the aforementioned kind wherein said input arm is connected to the actuating piston of a brake actuator and said output arm is connected to an output rod, said slack adjuster being supported on a first movable structural member which includes a pair of brake heads, said brake actuator being supported on a second movable structural member spaced from said first structural member and which includes a pair of brake heads, separation of said first and second movable structural members through said slack adjuster resulting in said pairs of brake heads engaging braking surfaces for braking a moving vehicle.

In a preferred arrangement, the input and output arms comprise an annular body defining a central opening and a radial extension depending from the annular body. In each of the arms, the radial extension facilitates connection between said arms and the actuating piston or the output rod. It is preferred that the rotatable member also be formed as an annular body defining a central opening, although the rotatable member does not require a radial extension.

It is preferred that the input and output arms and the rotatable member are adjacently located for coaxial rotation. In this arrangement, the slack adjuster may include a central post about which each of the input and output arms and the rotatable member are disposed in an adjacent and coaxial manner. The post may be stepped lengthwise in each of three spaced apart locations in order to support each of the input and output arms and the rotatable member.

In a preferred arrangement, the input arm and the output arm are connected through ratchet teeth in a manner that permits the required mutual and relative rotation in the respective first and second directions of rotation. A toothed ratchet connection can also be employed between the output arm and the rotatable member. In this arrangement actual compensation for slack occurs only when the amount of slack permits the relative rotation between the input and output arms to ratchet at least a single tooth. Any number of teeth can be employed in the ratchet connection, but the fewer teeth employed, means that greater slack will be required for a single ratchet movement. It is considered that a ratchet connection of at least 60 teeth is appropriate.

In a preferred arrangement, the input arm is connected to the push rod of a brake actuator, which is mounted on a movable structural member that includes a pair of brake heads. In this arrangement the slack adjuster can be mounted on another movable structural member, spaced from the first structural member, and which also includes a pair of brake heads. Each of the brake heads includes a friction material for engaging the braking surface of the wheels of a bogie and engagement of the friction material with the braking surface of the wheels occurs by separating the structural members on which the brake actuator and the slack adjuster are mounted. An arrangement of push rods moving linearly under brake actuation, permits this separation. In the above arrangement, the output arm of the slack adjuster, is connected to a second push rod, which extends into connection with the first structural member. Actuation of the brake actuator results in extension of the first push rod, which, through its engagement with the input arm, causes the input arm to rotate, and through the connection between the input arm and the output arm, the output arm is also rotated. The connection between the output arm and the second push rod causes the second push rod to move linearly in the opposite direction to the extension movement of the first push rod and the movement of the two push rods causes separating movement of the respective structural members. That movement permits engagement between the friction material and the wheels for braking the bogie.

Upon release of the brake actuating force, the push rods retract and the friction material is withdrawn from the bogie wheels. The correct spacing at rest between the friction material and the braking surface is termed the "block clearance". When the friction material wears, the block clearance increases and it is the operation of the slack adjuster to reposition the brake heads to return the block clearance to the preworn spacing. In the present invention, upon brake actuation, the input and output arms mutually rotate, and in the presence of slack, extra rotation is required to move the push rods and thus the structural members, the extra distance to take up the slack. That extra rotation is permitted, but only with relative rotation between the output arm and the rotatable member, as the rotatable member is confined to movement between predetermined end limits, provided for example, by suitable abutment means to rotate in either direction only an amount which corresponds to the block clearance.

When the brake actuation is released, the input and output arms and the rotatable member, each rotate in the reverse direction. The abutment means that limits rotation of the rotatable member also applies in the reverse rotation direction and through the connection between the rotatable member and the output arm, upon rotational movement of an amount corresponding to the block clearance, the output arm is also prevented from further reverse rotation. The input arm is not however so prevented and can continue to rotate relative to the output arm. That relative rotation continues for an amount equal to the slack to be taken up and repositions the input and output arms. If sufficient slack is present, then the input and output arms will ratchet and therefore will be permanently repositioned relative to one another. That repositioning affects the position of the push rods and also the structural members which, as a result, are spaced further apart bringing the brake heads closer to the bogie wheels and thus maintaining the correct block clearance.

The slack adjuster of the invention does not require energy storage and therefore does not need to employ the large springs of the prior art. Additionally, although the push rods of the preferred arrangement still extend through the central bolster, the opening required is smaller than in the prior art. The invention is also of a more simple construction compared to the prior art and is considered to be very robust and have low maintenance requirements.

BRIEF DESCRIPTION OF THE DRAWINGS

The attached drawings show an example embodiment of the invention of the foregoing kind. The particularity of those drawings and the associated description does not supersede the generality of the preceding broad description of the invention.

DETAILED DESCRIPTION

Figure 1:
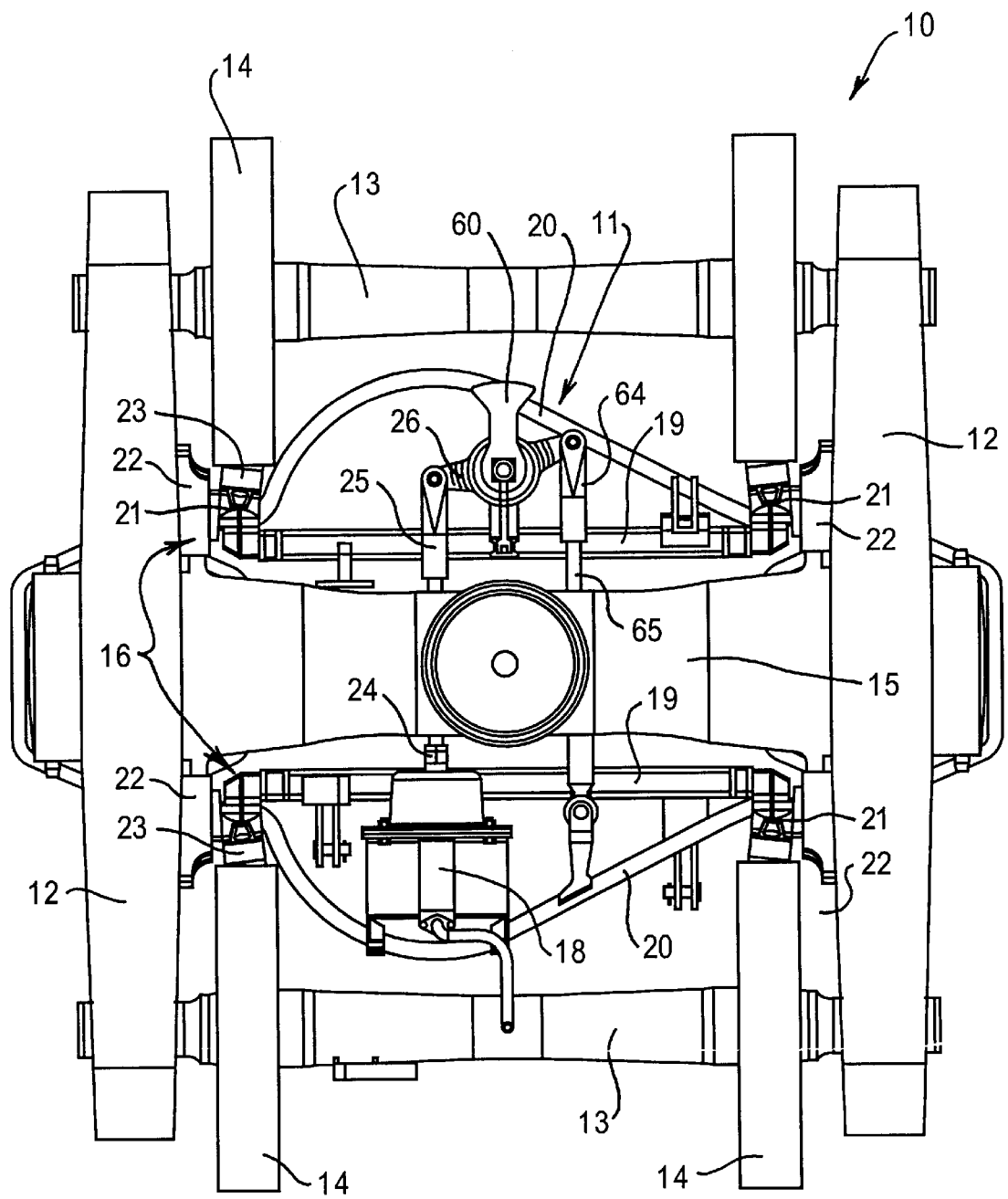
FIG. 1 is a plan view of a rail bogie that employs a rotary slack adjuster according to the present invention.

FIG. 1 is a plan view of a rail bogie 10 that employs a rotary slack adjuster 11 according to the invention. Briefly, the rail bogie 10 includes a pair of bogie side frames 12, wheel axles 13 and wheels 14, and a central bolster 15. The bogie 10 further includes support frames 16, that support brake friction material, a brake actuator 18 and the rotary slack adjuster 11 of the invention.

The brake actuator 18 is of pneumatic form and is connected at a forward end thereof to a first structural member 19, and at rear end thereof to a second structural member 20. The structural members 19 and 20 are connected at each end thereof, to respective brake heads 21 that are each slidably captured in a groove or channel formed in the side frames 12. The grooves or channels are not shown in FIG. 1, but they are formed in each of four frame portions 22 and slope in a downward direction toward the bolster 15, so that the structural members 19 and 20 tend to move the brake heads 21 away from the wheels 14 in absence of an oppositely acting brake actuating force. Each of the brake heads 21 includes friction material 23 for engaging the outer surface of the wheels 14, during brake actuation.

The brake actuator 18 includes a push rod 24 that extends into engagement with an input rod 25 of the slack adjuster 11. The input rod 25 is pivotably connected to a rotary input arm 26. The input arm 26 is shown in more detail in FIG. 2, which is an exploded view of the component parts of the slack adjuster 11. The input rod 25 is connected to the input arm 26 by a pin (not shown) that extends through the openings 27 of the input rod 25, and the opening 28 of the input arm 26, to pivotably connect the rod 25 and the arm 26 together, Thus, linear movement of the rod 25 causes rotary movement of the input arm 26.

Figure 3:
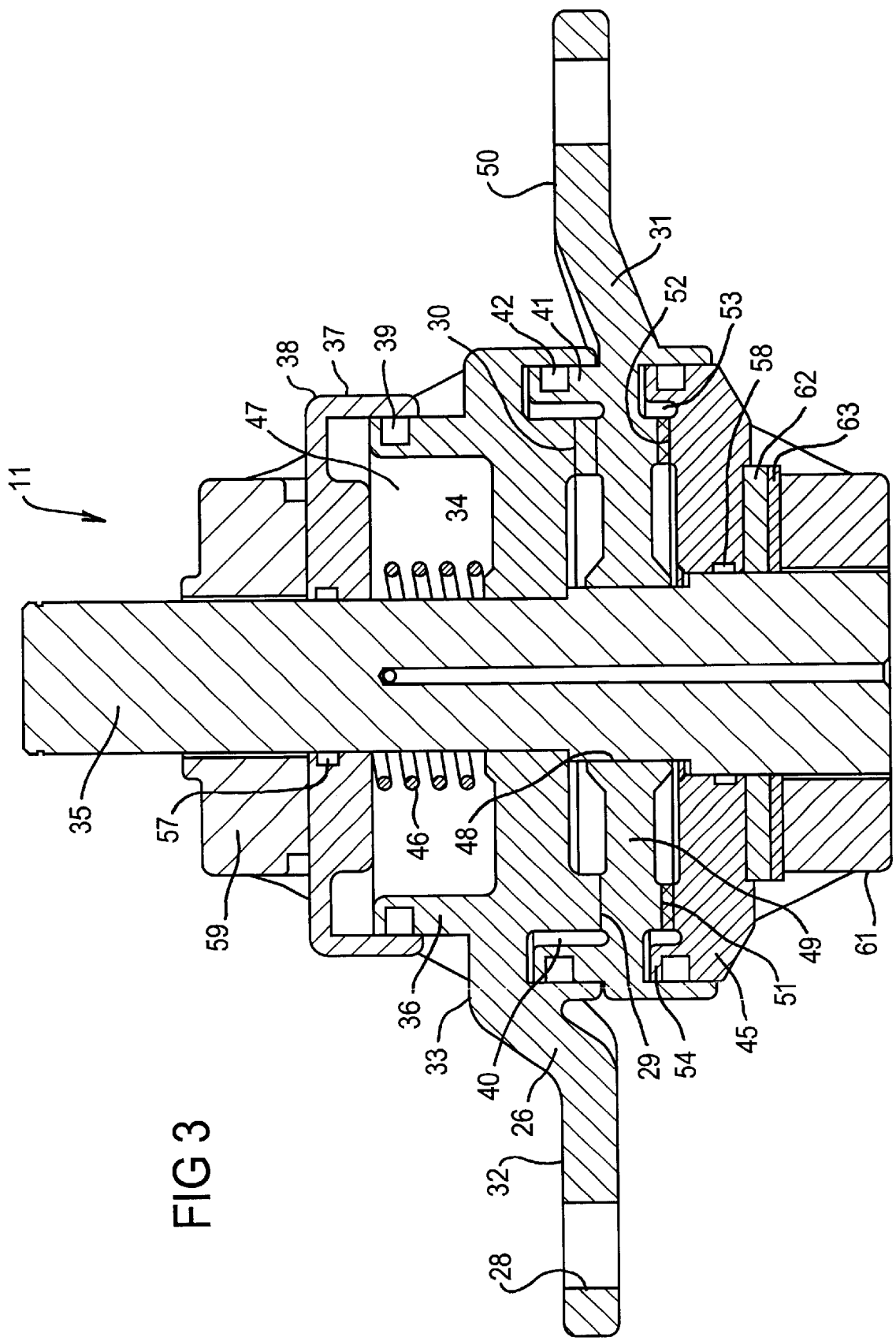
FIG. 3 is a cross-sectional view of the slack adjuster assembly shown in FIG. 2.

Referring to FIG. 3, the input arm 26 includes an annular ring of ratchet teeth formed on an underneath surface 29 thereof. That surface 29 is arranged for engagement with an upward facing surface 30 of an output arm 31. The upwardly facing surface 30 also includes an annular ring of ratchet teeth for ratchet engagement between the respective input and output arms. In a preferred arrangement, each of the surfaces 29 and 30 include 60 ratchet teeth, although the actual number of teeth can vary as required.

The input arm 26 includes a radial extension 32 depending from an annular body 33, The annular body 33 includes a central opening 34 for receipt of a centre post 35. The annular body 33 further includes an upstanding annular flange 36 that sealingly and rotatably cooperates with the downwardly extending annular flange 37 of a cover 38. The upstanding flange 36 includes a groove 39 for accommodating a seal between the respective flanges 36 and 37.

The input arm further includes an annular channel 40 for receiving in a sealed and rotatable manner, an upstanding annular flange 41 of the output arm 31. The flange 41 also includes a seal groove 42.

Figure 4:
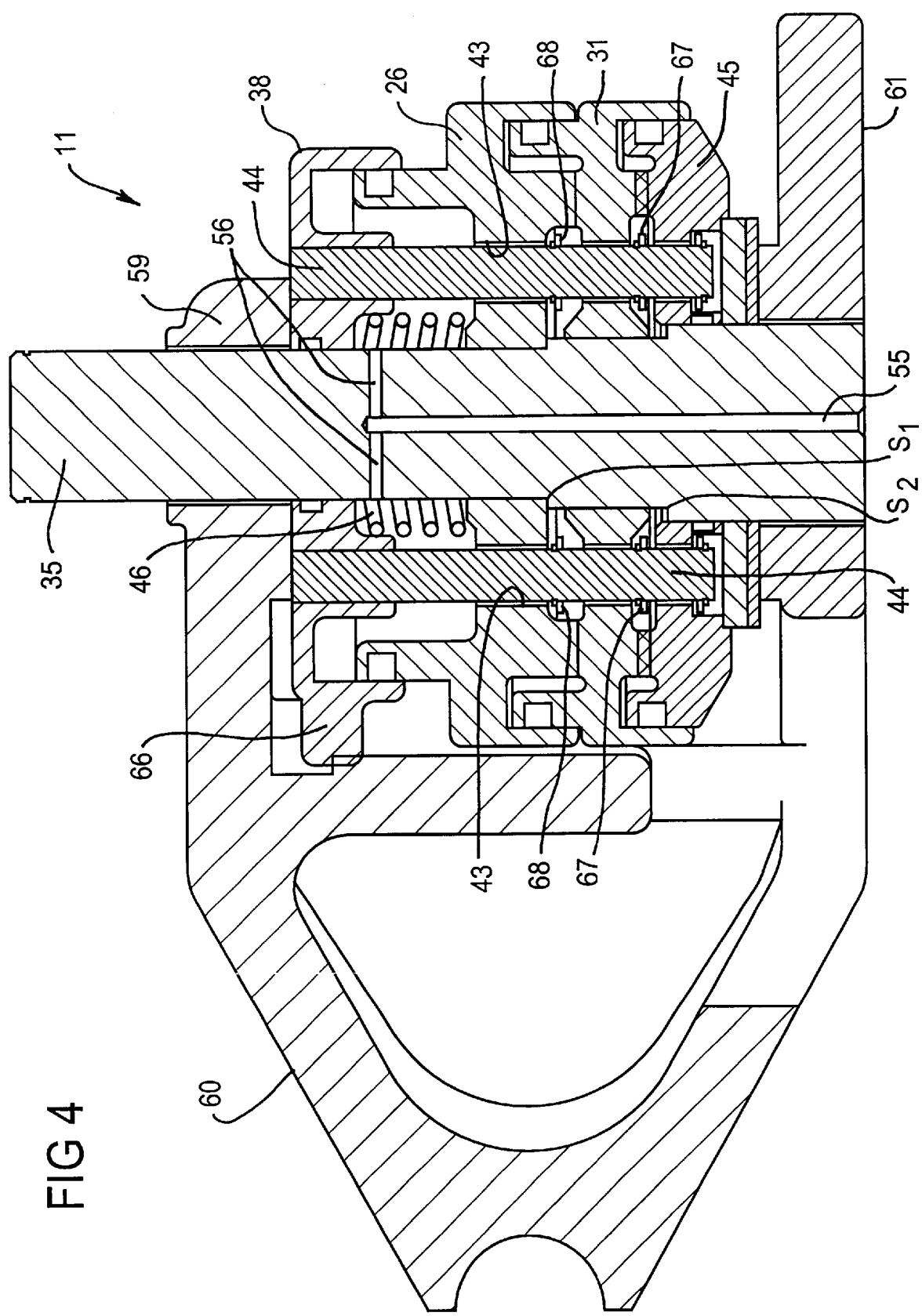
FIG. 4 is a cross-sectional view of the slack adjuster assembly of FIG. 2, rotated through 90° relative to FIG. 3.

FIG. 4 shows a cross-sectional view of the slack adjuster 11 perpendicular to the FIG. 3 view, and that view shows two further openings 43 in the annular body 32 for receiving stop pins 44. The openings 43 are in the form of part annular slots, so that the input arm 26 can rotate about the centre post 35 relative to the stop pins 44. The stop pins 44 extend through both of the input and output arms 26 and 31 and at one end, are located in the cover 38 and at the opposite end, in a base 45. The openings in the output arm 31 and the base 45 are also part annular slots to permit rotation relative to the stop pins 44. The openings in the cover 38 are formed to receive the upper ends of the locating posts without permitting relative rotation.

A coil spring 46 is disposed in a cavity 47 formed between the cover 38 and the input arm 26 and acts between those two parts to exert a separating biasing influence. That biasing influence prevents disconnection between the ratchet surfaces 29 and 30 but permits resetting of the input and output arms 26 and 31, as will be described later.

The output arm 31 includes a central opening 48, an annular body 49 and a radial extension 50, in a similar manner to the input arm 26. The output arm 31 further includes. an annular ring of ratchet teeth formed on an underneath surface 51, which surface is arranged for engagement with an upward facing surface 52 of the base 45, that is also formed with an annular ring of ratchet teeth. In a preferred arrangement, the surfaces 51 and 52 each include 120 ratchet teeth.

The output arm 31 further includes an annular channel 53 for accommodating an upwardly extending flange 54 depending from the base 45 and the flange 54 includes an 0-ring groove for accommodating a seal for sealing against the inner face of the channel 53.

As shown in FIG. 4, the centre post 35 is stepped at $S_1$ and at $S_2$. These steps engage the input arm 26 and the output arm 31 when the centre post 35 is lifted during resetting of the slack adjuster as is described later. The centre post 35 further includes a central conduit 55 and a pair of branching conduits 56 providing a breather outlet for the cavity 47. Seals can be provided in each of the grooves 57 and 58 to prevent leakage of lubricating fluid out of the slack adjuster.

A cap 59 is secured over the cover 38 and the cap 59 forms part of a connecting bracket 60 employed to connect the slack adjuster 11 to the second structural member 20. The bracket 60 also includes a base plate 61, whereby the components of the slack adjuster are sandwiched between the cap 59 and the base plate 61. Each of the cap 59 and the base plate 61 include openings to accept each end of the centre post 35. These openings each include a bush (not shown) for low friction rotation of the centre post therein. Between the base plate 61 and the base 45, is located a damping ring 62. which would normally be of a rubber material, and a low friction ring 63, which would normally be of a nylon material. The low friction ring 63 permits low friction rotation of the base 45 relative to the base plate 61, while the damping ring absorbs excessive vibration.

The operation of the slack adjuster 11 is as follows. Brake actuation is initiated by the brake actuator 18 which extends the push rod 24 outwardly. The push rod 24 causes a linear shift in the input rod 25, which is thereafter transmitted to the slack adjuster through rotary movement of the input arm 26. By the ratchet engagement of the input arm 26 with the output arm 31, the output arm 31 also rotates by an equal amount with the input arm and shifts the output rod 64 in the opposite linear direction to the input rod 25. That movement shifts the push rod 65 and applies a shifting force to the second structural member 20 to which it is connected. The opposite shifting movement of the output and input arms 24 and 65 forces the pairs of first and second structural members apart and causes the brake heads 21 to shift up the grooves or channels formed in the frame portions 22 of the side frames 12 to push the friction material 23 against the wheels 14. Over time, wear of the friction materials increases the clearance between the friction material 23 and the wheels 14 and requires a greater linear shift of the output and input arms 24 and 65 to apply the friction material 23 against the wheels 14, The slack adjuster 11 compensates for wear of the friction material, by increasing the separation between the pairs of first and second structural members and that is achieved by relative ratchet rotation between the input and output arms 26 and 31.

When the brake actuator 18 is applied, the input arm 26 drives the output arm 31 through the first ratchet connection, in a rotary manner. At the same time, the output arm 31 drives the base 45 through the second ratchet connection and thus each of these parts rotates. When the parts have rotated by an amount corresponding to the required clearance between the friction material and the wheel braking surface (the "block clearance"), the base 45 is stopped from further rotation by slot engagement with the stop pins 44. That is, the annular extent of the slots in the base 45 is set to allow rotative movement of the base 45 only to an amount corresponding to the desired block clearance. The cover 38 never rotates, by engagement of a lug 66 with the bracket 60 (FIG. 4).

With the base 45 restrained against further rotation, if there is slack to be absorbed, the input and output arms 26 and 31 continue to rotate by the output arm ratcheting relative to the base 45.

When the brake actuating force is released, the input arm 26, the output arm 31 and the base 45 all rotate in the reverse direction. When that rotation corresponds to the amount of desired block clearance, the base 45 is again retrained from further rotation by engagement with the stop pins 44. The ratchet connection between the base 45 and the output arm 31 prevents further rotation of the output arm 31, and therefore only the input arm 26 continues to rotate, and that arm ratchets relative to the output arm 31. That ratchet rotation continues until the push rod 24 reaches the fully released or retracted position. The input and output arms 26 and 31 are thus repositioned relative to one another and by that repositioning the slack in the system is compensated for. Effectively, the input and output arms 26 and 31 are relatively rotated, so that in the released condition, the input and output arms 25 and 64, and the push rods 24 and 65 increase the separation between the respective pairs of structural members, so that the brake heads 21 move up the downwardly sloping grooves in the frame portions 22 to position the brake heads 21 closer to the wheels 14. In this arrangement, it is expected that the input arm 26 will only ratchet relative to the output arm 31, about ten times during the life of the friction material. It is expected that a ratchet movement will occur for every 4 mm of friction material wear.

The number and ratio of ratchet teeth in the two ratchet pairs is largely a matter of design choice and is not restricted to 60 and 120 teeth as described herein. The ratchet engagement between the input and output arms 26 and 31 is exposed to most of the load and therefore those teeth need to be more robust than the other ratchet teeth. With 60 teeth, one ratchet movement provides 6° of relative rotation and provides the approximate 4 mm of linear adjusting movement referred to earlier.

When the friction material 23 has worn sufficiently to require replacement, the slack adjuster 11 must be reset when new material is fitted. For this, a reset cable (not shown) is provided to enable the centre post 35 to be lifted which in turn lifts the input arm 26 and disengages the first ratchet surfaces 29 and 30 and the second ratchet surfaces 51 and 52. The base 45 is restrained against lifting by the circlip stops 67 fixed to the stop pins 44, while the output arm 31 is prevented from lifting too far, by the circlip stops 68 also on the stop pins 44. By disengagement of the ratchet surfaces, the input and output arms can be reset. Approximately 8 mm of lift needs to be applied to the centre post 35 to disengage both sets of ratchets.

Figure 2:
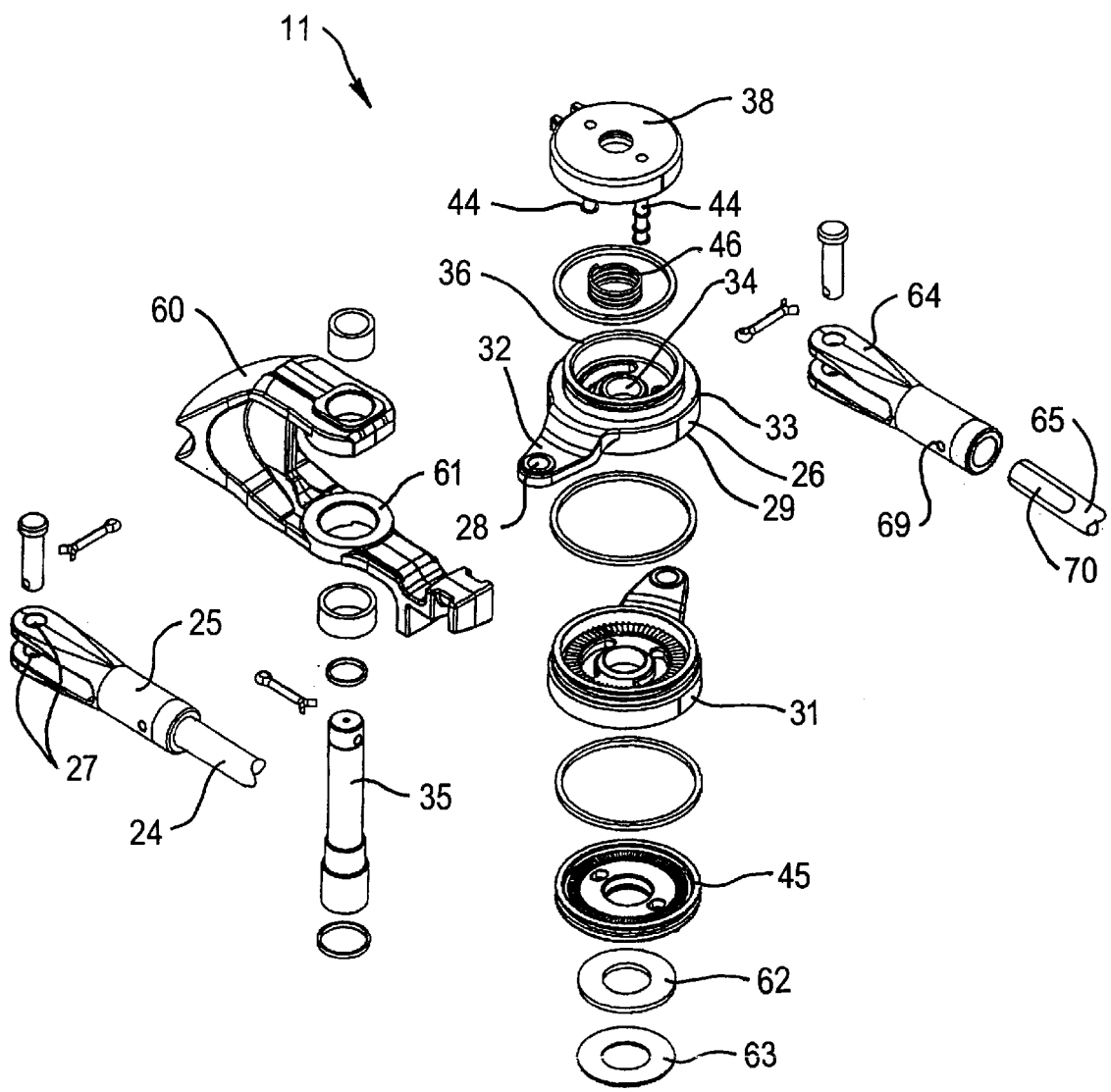
FIG. 2 is an exploded view of the components of a rotary slack adjuster according to the present invention.

In FIG. 2, it can be seen that the connections between the push rods 24 and 65, and the input and output rods 25 and 64, is by way of slotted engagement. Referring to FIG. 2, pins 69 which are fixed to the input and output rods 25 and 64 respectively, run in slots 70 in the ends of the push rods 24 and 65. This arrangement permits a separate handbrake mechanism to be employed that does not cause the slack adjuster to ratchet. When a handbrake is applied to separate the two pairs of structural members, the input and output rods 25 and 64 move relative to the push rods 24 and 65 so that the input and output arms 26 and 31 do not rotate. The slots 70 have an axial length about equal to the block clearance between the friction material 23 and the wheels 14. Thus, the handbrake can be applied, with movement of the push rods taking up the lengthwise extent of the slots 70 and thus causing no movement of the rods 25 and 64 and no (or only minor) rotation of the input and output arms 26 and 31.

The invention described herein is susceptible to variations, modifications and/or additions other than those specifically described and it is to be understood that the invention includes all such variations, modifications and/or additions which fall within the spirit and scope of the above description.

What is claimed is:

1. A rotary slack adjuster for use in a brake system of a vehicle for compensating for wear in brake friction lining, said adjuster including an input arm for connection to an actuating piston of a brake actuator, an output arm for connection to an output rod, and a rotatable member, coupling means being provided for coupling said input arm, said output arm and said rotatable member together for mutual rotation during brake actuation in each of a first direction and a second opposite direction, said rotatable member being confined to rotate between end limits in each of said first and second directions, wherein said coupling means permits said input arm and said output arm to further mutually rotate in said first direction relative to rotatable member upon said rotatable member rotating to said end limit in said first direction, and said coupling means being arranged so that upon relative rotation between said input and output arms and said rotatable member exceeding a predetermined amount, said input and output arms are restrained against return rotation relative to said rotatable member and are thus repositioned relative to said rotatable member, and wherein said coupling means permits said input arm to further rotate in said second direction relative to said output arm and said rotatable member upon said rotatable member rotating to said end limit in said second direction at which end limit said coupling means prevents further rotation in said second direction of said output arm, and said coupling means being arranged so that upon relative rotation between said input arm and each of said output arm and said rotatable member exceeding a predetermined amount, said input arm is restrained against return rotational movement relative to said output arm and said rotatable member, and said input arm is thus repositioned relative to said output arm and said rotatable member, wherein in use, a brake system including said slack adjuster is arranged so that the respective repositioning of said input and output arms results in a shift in the brake friction lining toward the braking surface, so compensating for wear in said friction lining, said slack adjuster further including a bracket for connecting said slack adjuster to a support, said bracket including first and second spaced apart members between which each of said input and output arms and said rotatable member are positioned for rotation, biasing means being provided to bias said input and output arms and said rotatable member together, but permitting separation thereof to facilitate relative rotation between said output arm and said rotatable member and between said input arm and said output arm as necessary.

2. A rotary slack adjuster according to claim 1, each of said input and output arms including a radial extension depending from an annular body, said radial extension facilitating connection of said input and output arms respectively to said actuating piston and said output rod.

3. A rotary slack adjuster according to claim 2, said rotatable member being formed by an annular body.

4. A rotary slack adjuster according to claim 3, each of said annular bodies of said input and output arms and said rotatable member being sealingly engaged and said slack adjuster including means to introduce lubricating oil or grease for lubricating relatively moving parts.

5. A rotary slack adjuster according to claim 4, including a cover sealingly engaging said annular body of said input arm and said lubricating oil or grease being introduced into a cavity defined between said cover and said annular body of said input arm.

6. A rotary slack adjuster according to claim 1, each of said input and output arms and said rotatable member being arranged for coaxial rotation.

7. A rotary slack adjuster according to claim 6, each of said input and output arms and said rotatable member being disposed for rotation about a post which extends through the centre of each respective annular body.

8. A rotary slack adjuster according to claim 7, said post being stepped for supporting in adjacent coaxial relationship each of said input and output arms and said rotatable member.

9. A rotary slack adjuster according to claim 1, said coupling means including a ratchet connection between said input and output arms.

10. A rotary slack adjuster according to claim 1, said coupling means including a ratchet connection between said output arm and said rotatable member.

11. A rotary slack adjuster according to claim 10 said ratchet connection extending axially.

12. A rotary slack adjuster according to claim 1, further including abutment means for abutting engagement with said rotatable member at each of said end limits of rotation.

13. A rotary slack adjuster according to claim 12 said abutment means including a pair of abutment members extending through openings in each of said input and output arms and said rotatable member, said openings in said input and output arms permitting greater rotation thereof than said openings in said rotatable member.

14. A rotary slack adjuster according to claim 13, said abutment members each comprising a post extending between said first and second spaced apart members of said bracket.

15. A brake system for a vehicle, including a slack adjuster according to claim 1, wherein said input arm is connected to the actuating piston of a brake actuator and said output arm is connected to an output rod, said slack adjuster being supported on a first movable structural member which includes a pair of brake heads, said brake actuator being supported on a second movable structural member spaced from said first structural member and which includes a pair of brake heads, separation of said first and second movable structural members through said slack adjuster resulting in said pairs of brake heads engaging braking surfaces for braking a moving vehicle.

16. A brake system according to claim 15, wherein said vehicle is a rail bogie.

17. A brake system according to claim 15, wherein said output rod extends from said output arm into connection with said second movable structural member, actuation of said brake actuator causing extension of said actuator piston to rotate said input arm of said slack adjuster in said first direction, said output arm being caused to rotate through coupling with said input arm and to extend said output rod, said actuator piston and said output rod being disposed substantially parallel and during brake actuation, being extended in substantially opposite directions and causing said first and second movable structural members to separate.

18. A brake system according claim 15, wherein said vehicle includes a central structural bolster that extends between said first and second movable structural members and which includes an opening of a size sufficient to permit each of said actuating piston and said output rod to extend therethrough.

19. A brake system according to claim 15, wherein said first and second movable structural members are separated during brake actuation over respective ramp surfaces that cause said members to shift upwardly and whereby said members return to a brake disengaged position under their own weight by sliding down said ramp surfaces when said brake actuation is released.

20. A vehicle including a brake system according to claim 15.

21. A vehicle including a slack adjuster according to claim 1.

* * * * *